No. 736,658. PATENTED AUG. 18, 1903.
G. W. WHITTINGTON.
WIRE FENCE MACHINE.
APPLICATION FILED JUNE 16, 1902.
NO MODEL. 8 SHEETS—SHEET 1.
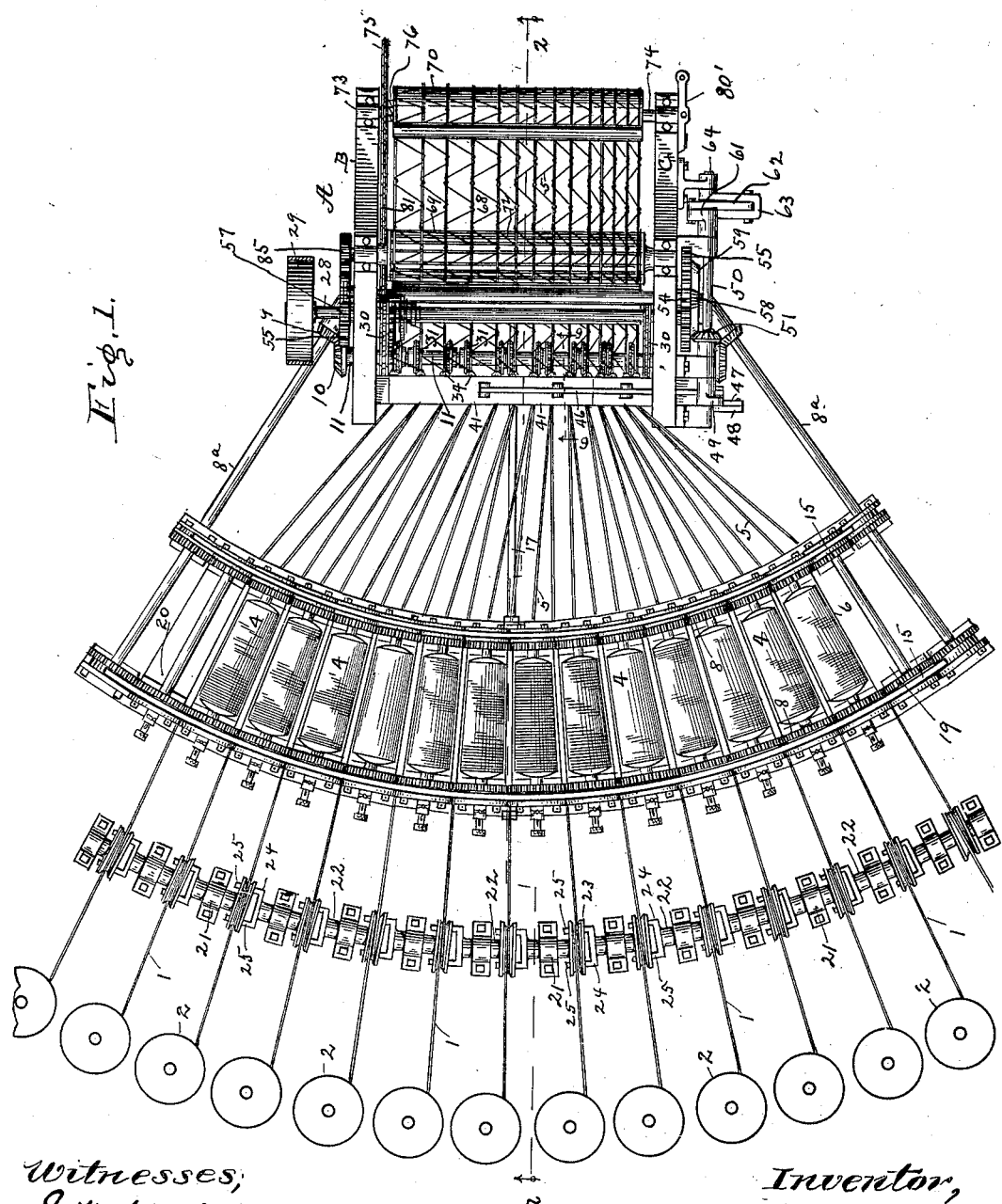
Witnesses;
Inventor,
George W. Whittington,
By Joseph A. Minturn,
Attorney.

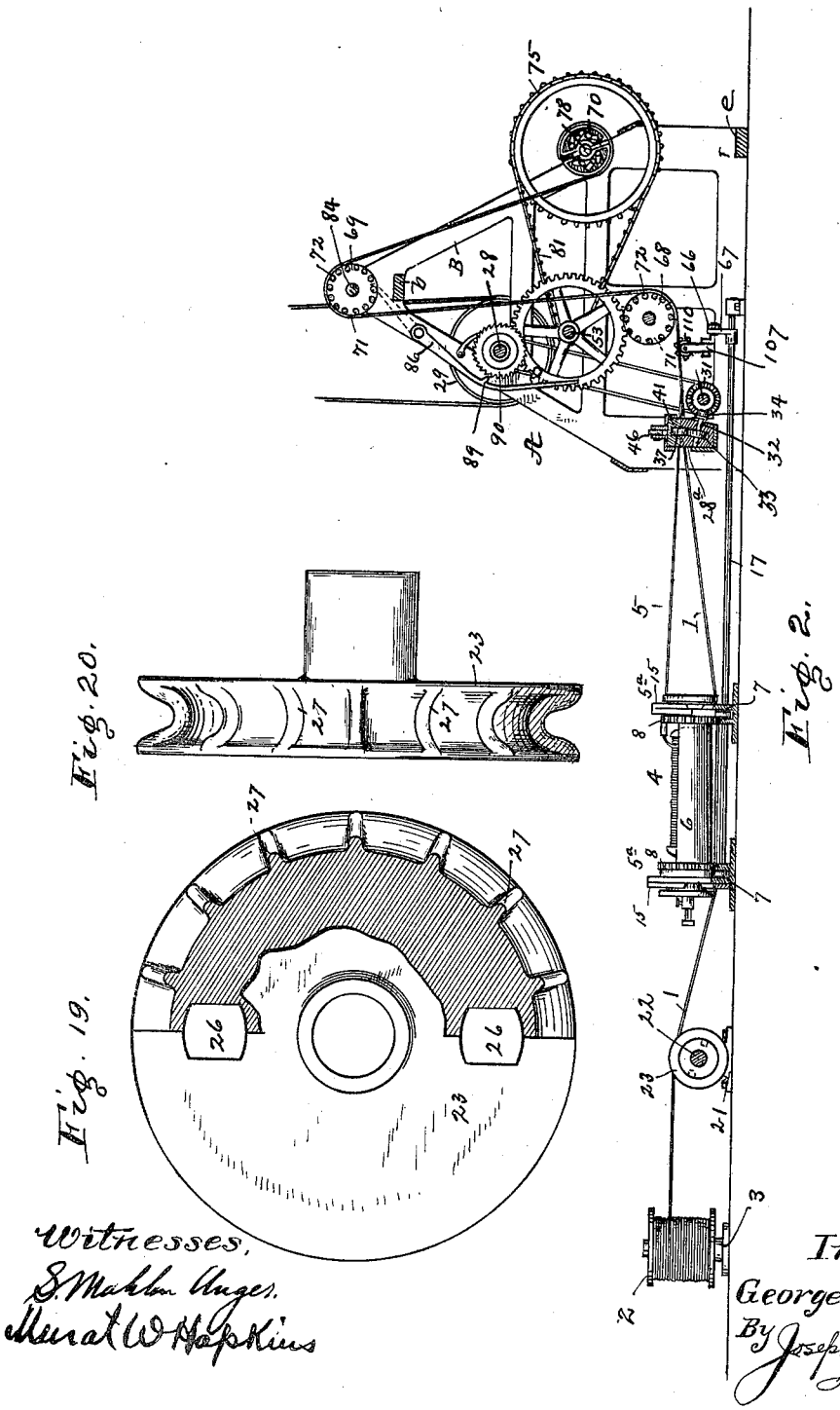

No. 736,658. PATENTED AUG. 18, 1903.
G. W. WHITTINGTON.
WIRE FENCE MACHINE.
APPLICATION FILED JUNE 16, 1902.
NO MODEL. 8 SHEETS—SHEET 3.
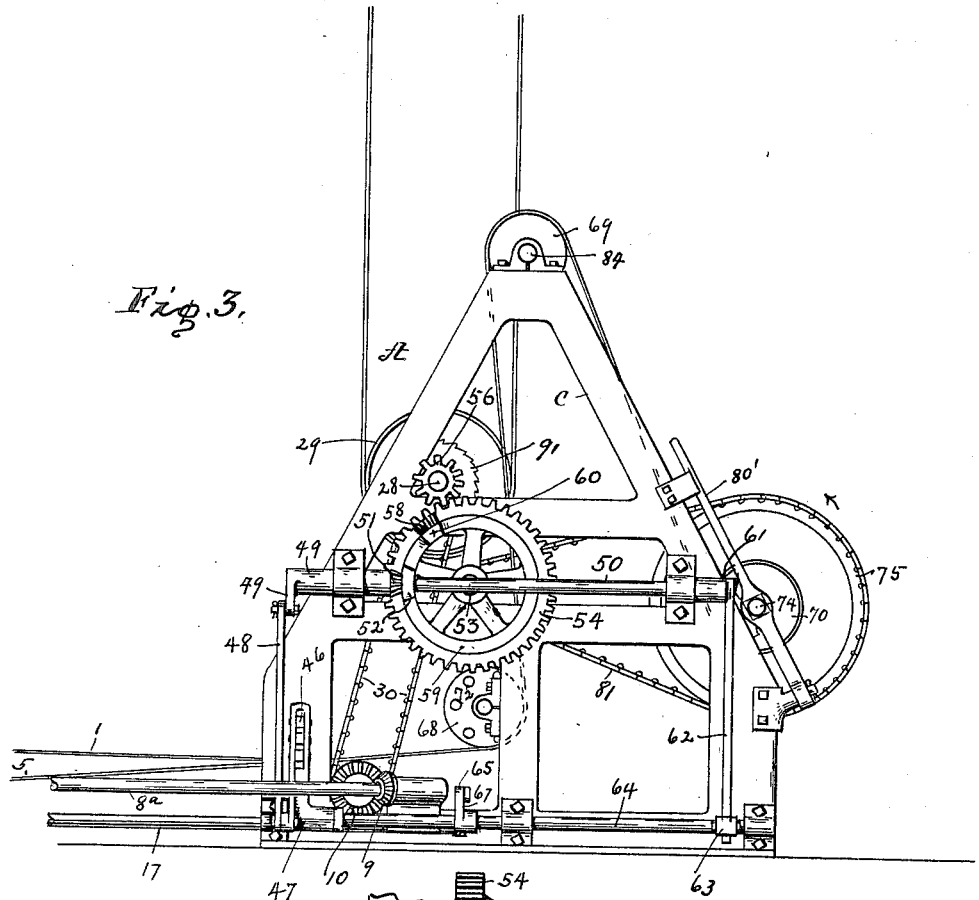
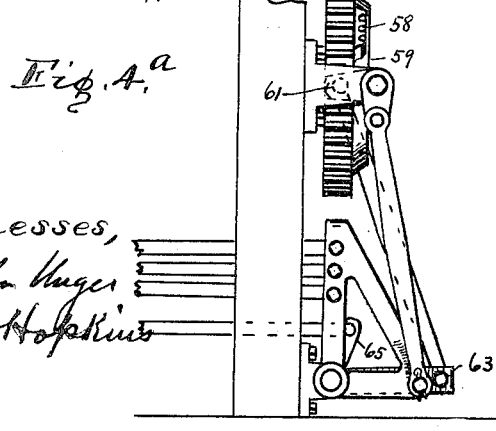
Witnesses,
Inventor,
George W. Whittington,
By Joseph A. Minturn
Attorney,

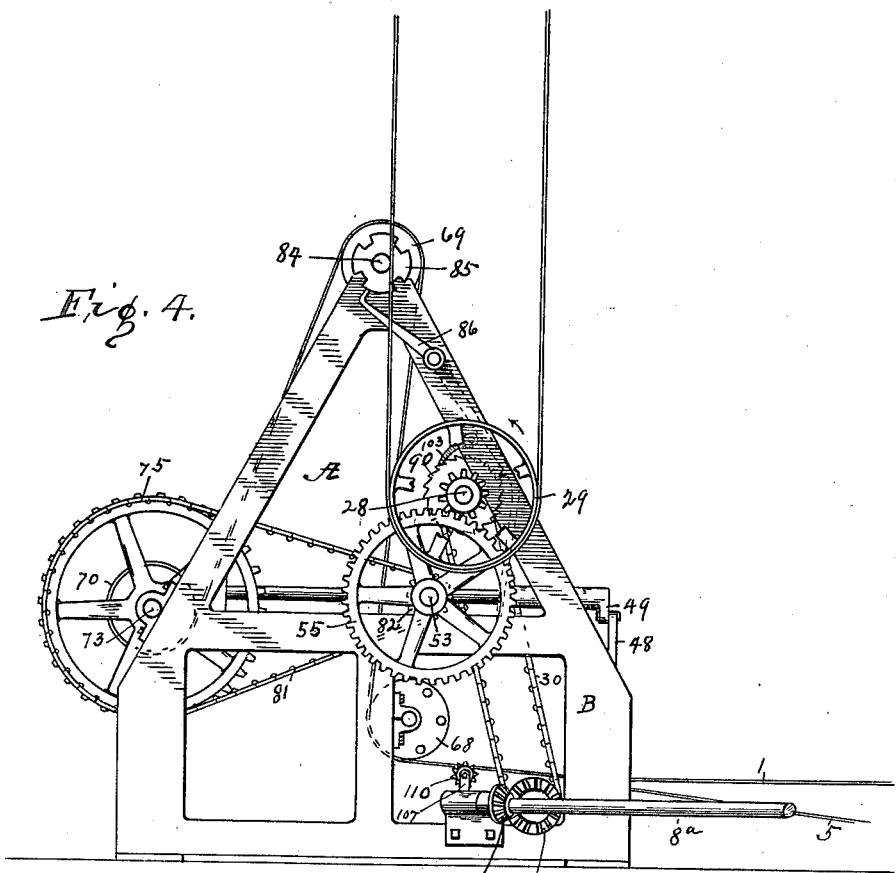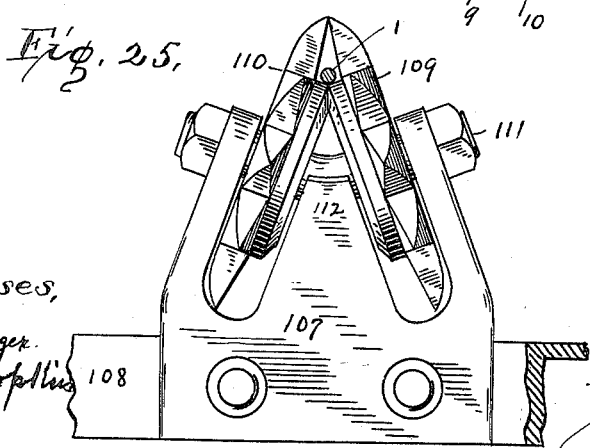

No. 736,658. PATENTED AUG. 18, 1903.
G. W. WHITTINGTON.
WIRE FENCE MACHINE.
APPLICATION FILED JUNE 16, 1902.
NO MODEL. 8 SHEETS—SHEET 5.
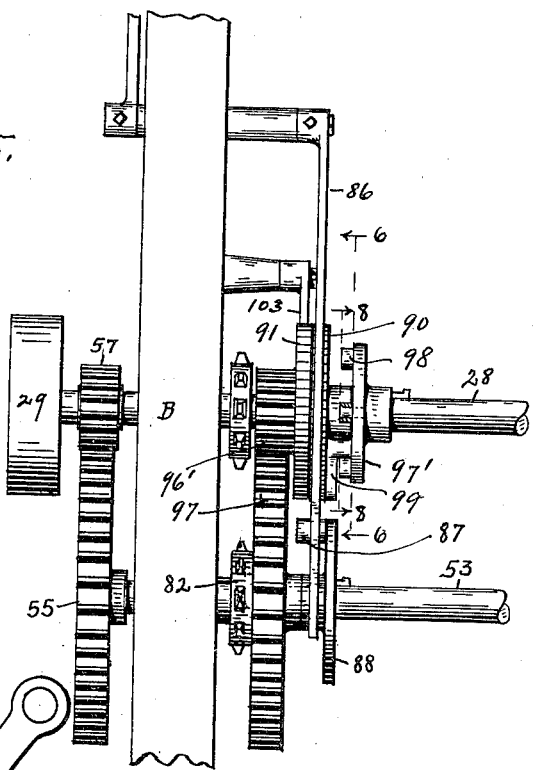
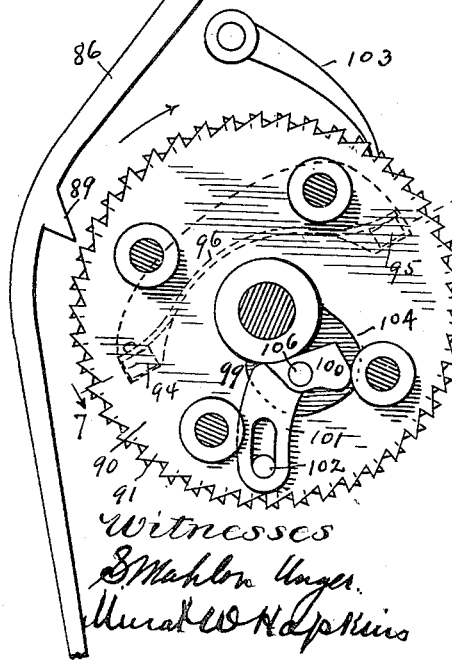
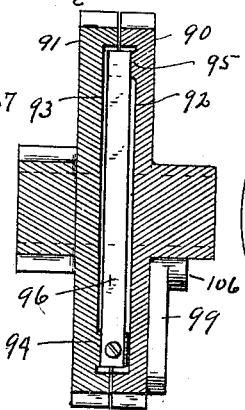
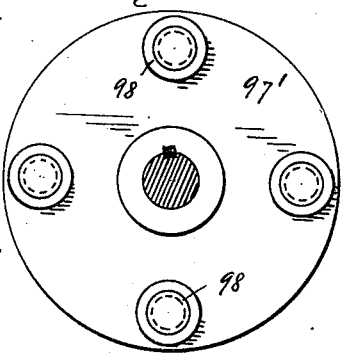
Witnesses
S. Mahlon Unger.
Murat W. Hopkins
Inventor,
George W. Whittington,
By Joseph A. Minturn.
Attorney, No. 736,658. PATENTED AUG. 18, 1903.
G. W. WHITTINGTON.
WIRE FENCE MACHINE.
APPLICATION FILED JUNE 16, 1902.
NO MODEL. 8 SHEETS—SHEET 6.
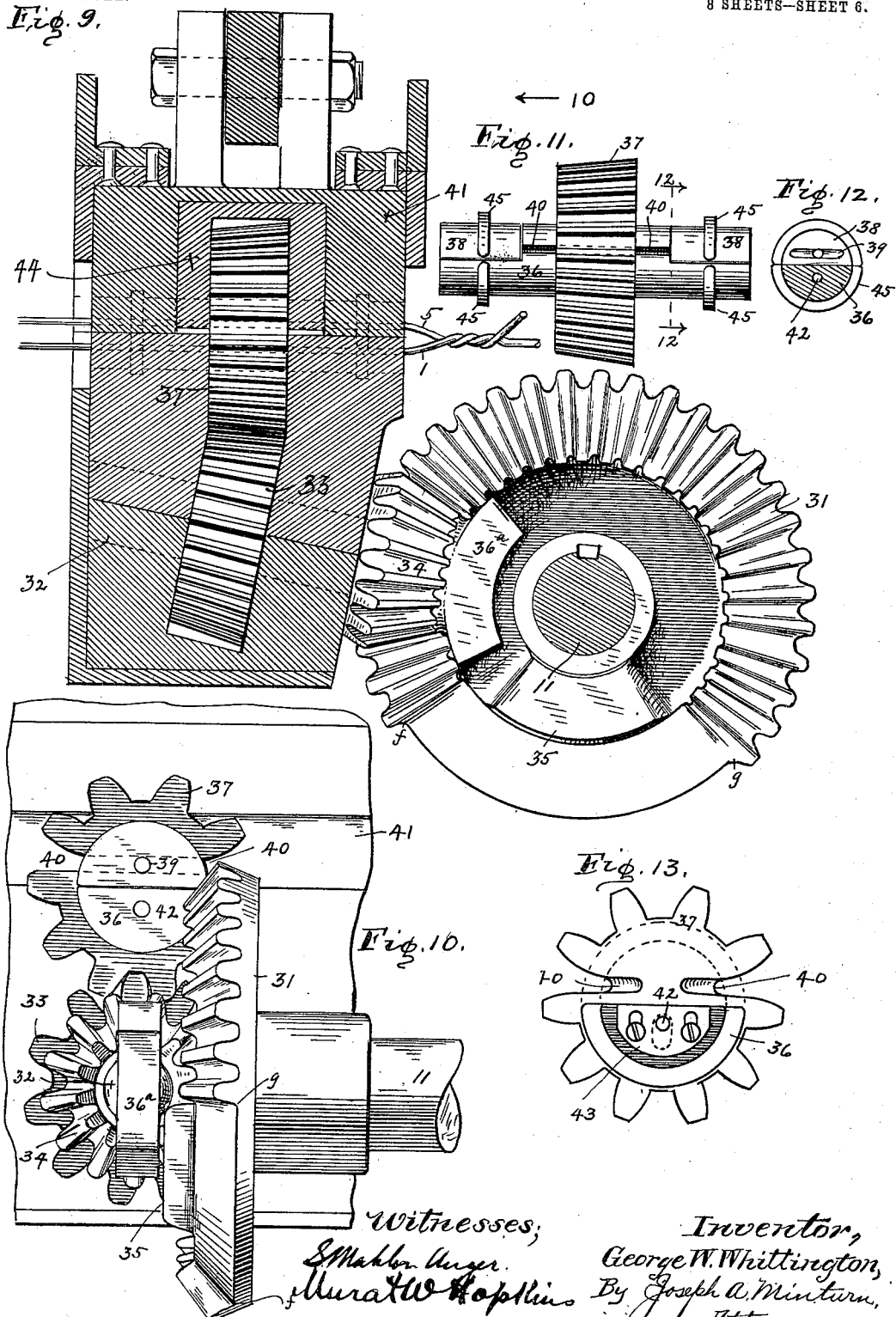
Witnesses:
Inventor,
George W. Whittington,
By Joseph A. Minturn,
Attorney.

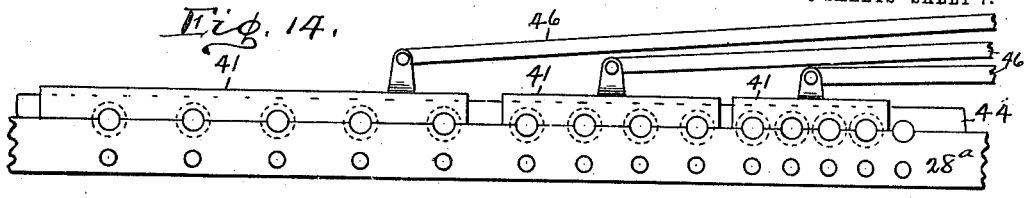
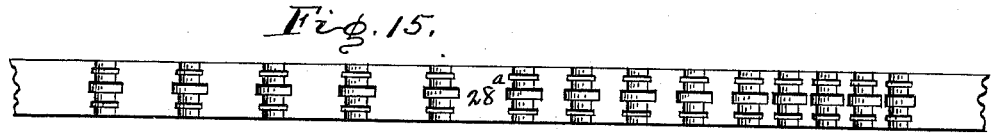
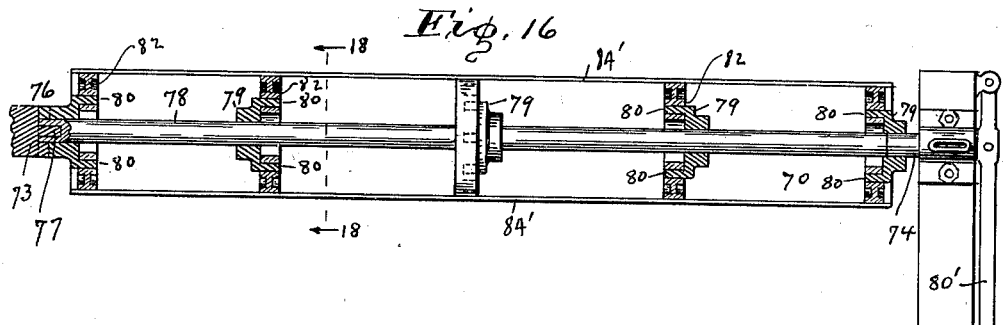
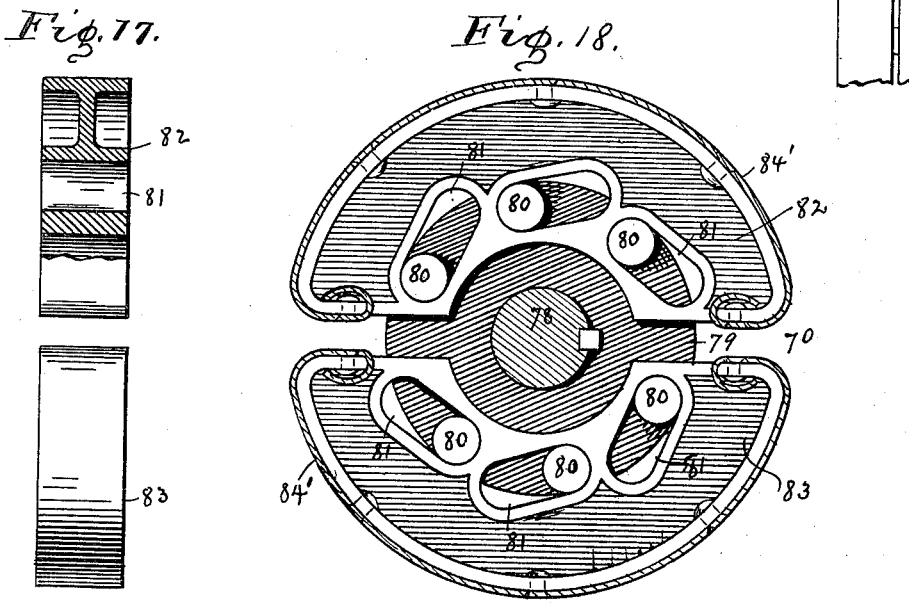

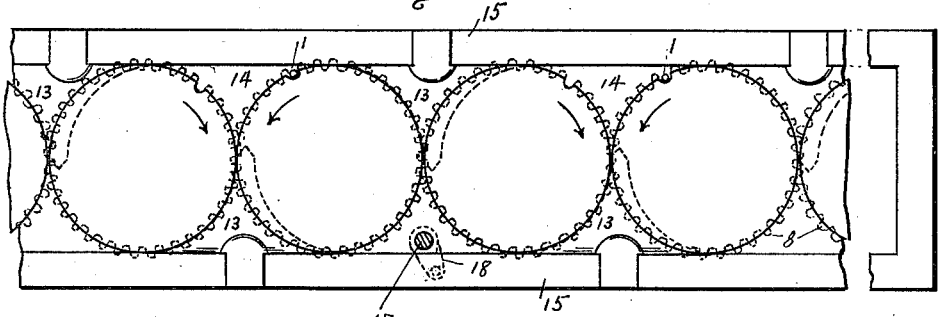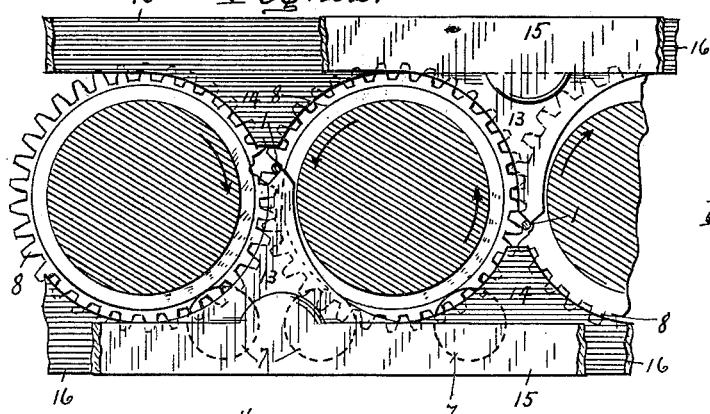

No. 736,658. Patented August 18, 1903.

UNITED STATES PATENT OFFICE.

GEORGE W. WHITTINGTON, OF INDIANAPOLIS, INDIANA.

WIRE-FENCE MACHINE.

SPECIFICATION forming part of Letters Patent No. 736,658, dated August 18, 1903.

Application filed June 16, 1902. Serial No. 111,833. (No model.)

*To all whom it may concern:*

Be it known that I, GEORGE W. WHITTINGTON, a citizen of the United States, residing at Indianapolis, in the county of Marion and State of Indiana, have invented certain new and useful Improvements in Wire-Fence Machines, of which the following is a specification.

This invention relates to improvements in machines for weaving wire-fencing material having horizontal strands connected by diagonal intermediate wires, the said horizontal and intermediate wires being twisted together at their meeting-points; and the object of the invention is to provide a durable and practical machine that will take the wire off of the reels, automatically weave the fence, and reel the finished product into rolls for convenient handling.

I accomplish the objects of the invention by the mechanism illustrated in the accompanying drawings, in which—

Figure 1 is a top or plan view of my complete invention; Fig. 2, a vertical section on the line 2 2 of Fig. 1; Fig. 3, a right side elevation of the main machine; Fig. 4, an elevation of the opposite or left side of the main body portion of the machine; Fig. 4ª, a detail in front elevation of the lower right side of the machine, showing the bell-crank to which the twister-levers are attached; Fig. 5, a plan view of the mechanism for securing an intermittent movement of the fencing material through the machine; Fig. 6, a detail in side view of the parts seen from the line 6 of Fig. 5 looking in the direction of the arrow; Fig. 7, a section through the ratchet-wheels shown in Fig. 6 on the line 7 7; Fig. 8, a view of the roller-plate from the line 8 8 of Fig. 5; Fig. 9, a section on the line 9 9 of Fig. 1, showing the wire-twisting mechanism; Fig. 10, an elevation of same looking in the direction of the arrow 10 of Fig 9. Fig. 11 is a detached view, in side elevation, of the two-part shaft and toothed wheel used in the twister. Fig. 12 is a section on the line 12 12 of Fig. 11. Fig. 13 is an end view of the shaft shown in Fig. 11, illustrating the adjustment of the separating distance between the wires. Fig. 14 is a detail in side elevation of the cross-bar bearing to receive the wire-twisters with the twisters removed; and Fig. 15 a top view of the lower bar, showing the seats for the twister-shafts. Fig. 16 is a longitudinal central section of the reel on which the finished product is wound; Fig. 17, a detail in side elevation and partial section of one of the drum-supports; Fig. 18, a section on the line 18 18 of Fig. 16; Fig. 19, a side elevation and partial section of one of the tension-wheels located adjacent to the wire-reels. Fig. 20 is a face or edge view of said wheel. Fig. 21 is an end view of a double pair of spool-holders, showing mechanism for rotating the spools and holding and shifting the fence-wires. Fig. 22 is a similar detail on a larger scale, showing some of the parts broken away and others partially sectioned. Fig. 23 is a longitudinal central section of one of the spool-holders with a spool of wire in operative position, and Fig. 24 is an elevation of a section of the fence made by my machine. Fig. 25 is a detail on larger scale of the device for holding the wires straight as they leave the twisters.

Like characters of reference indicate like parts throughout the several views of the drawings.

The wires 1, from which the horizontal strands of the fence are formed, are wound on spools 2 (see Figs. 1 and 2) of any usual and well-known construction. These spools are supported on suitable standards 3.

It will be noted on examination of Fig. 24 that the horizontal strands are closest together at the lower part of the fence, that the middle strands are farther apart than the lower strands, and that the strands of the upper third of the fence are the farthest apart of all. It will also be noted that the horizontal and diagonal wires are twisted together and not simply one wire coiled around the other. The drawings represent a fence having fourteen horizontal strands, and the machine illustrated is for the manufacture of such a fence.

A represents the body of the machine where the fence is formed. Between said body and the spools 2 are the horizontally-mounted spools 4, which furnish the wires 5 for the cross-strands of the fence. The spools 4 number one less than the number of horizontal strands. They are placed in a single horizontal row with their axes converging toward the machine-body A, as shown in Fig. 1. The spools 4 are made to rotate, and both the horizontal and the cross wires are threaded through the revoluble spool-holders and are held and carried around thereby in unison with the wire-twisters at the machine-body in order to prevent entanglement of said wires by the operative movements of the twisters. Each spool 4 is mounted between circular revolving heads $5^a$ $5^a$, and the heads are connected by a half-cylindrical shell 6, which insures uniform rotation of said heads. The disks rest upon friction-wheels 7 7 and have the annular row of cogs 8, whereby the head of one spool is geared to the heads of the spools adjacent to it on either side. The heads are in this manner geared together in two trains or series, one at either end of the spools. The outside heads are mounted on shafts $8^a$ $8^a$, which are connected by bevel-wheels 9 and 10 with the shaft 11 of the body A of the machine. The heads are provided with transverse grooves 12, through which pass the horizontal wires 1. The wires 1 are each carried around two revolutions of a pair of heads and are then transferred to an adjacent pair and carried around twice in the opposite direction. The wires are held from displacement during the rotation of the heads by plates 13 and 14, (see Figs. 21, 22, and 23) carried by frames 15 and 16, respectively. The plates are pointed, the sides being on curved lines concentric with the axis of the revolving head. The heads have circumferential grooves in which the edges of the plates take, and these edges form guards to retain the wires. One of the frames 15 will have a reciprocating adjustment transmitted by the rocking bar 17 through arm 18, carried by the bar and pivotally secured to the frame, as shown in Fig. 21. The means for rocking the shaft at right intervals will be hereinafter fully described. Every alternate one of the top row of plates and every alternate one of the bottom row will be fastened to and carried by the frame 15. The remaining plates 14 will be attached to the stationary frame 16. The movable plates will have sharpened ends, which at each shift of the frame are brought between the head and the approaching wire and throw the wire over into the adjacent head, which is rotating in reverse direction. Fig. 22 represents a wire being transferred from the right head to the middle one and from the middle one to the one at the left of it. As there are fourteen horizontal wires and thirteen intermediate wires, the machine will require at all times a pair of heads which is not serving as a spool-carrier, and as this extra carrier is needed first at one end of the row and then at the other I provide two extra pair of heads 19 and 20, located at opposite ends of the row of spool-carriers, as shown in Fig. 1. The wires 5 from spools 4 pass through suitable openings in the inner heads, as shown by dotted lines in Fig. 23, and are kept from entanglement with the spool by the lug $21^a$.

Located between the reels or spools 2 and the row of spools 4 are the boxes 21, having the shafts 22, on one end of each of which is the grooved tension-wheel 23, around which the wire from the reel opposite it is wound one turn, and to insure a uniform feeding movement of the wheels I connect them together by means of a loose coupling, which permits an arrangement of the shafts on a curve. This coupling consists of a disk 24 with fingers 25 25, which take into openings 26 26 in the solid web of the wheel 23. The groove of wheel 23 is provided with the transverse ribs 27 to increase the hold on the wire.

The body A of the machine comprises the two sides B and C, which are connected by the cross-bars $b$, $e$, and $28^a$ and the several shafts and their attachments.

Mounted transversely of the frame B C in suitable boxes is the shaft 28, having pulley 29, to which power is transmitted by belt, as shown, and mounted near the base of the machine-frame is the parallel shaft 11, which has been previously referred to. These shafts have suitable pulleys, which are connected by the chain belts 30 30. Mounted on shaft 11 are fourteen toothed and beveled wheels 31, grouped in pairs, with the backs of each pair together. Mounted in bearings in the adjacent bar $28^a$ are fourteen short shafts 32, each having a cogged wheel 33 in a suitable recess or cavity of the bar $28^a$ and an outside pinion 34, which meshes with one of the wheels 31, and in order to transmit an intermittent movement to the shaft 32 the teeth from $f$ to $g$ on wheel 31 will be removed. Between the space thus bared and the shaft on which the wheel is mounted is the flat raised surface 35, forming a table against which the flat-sided hub extension $36^a$ from wheel 34 bears and holds the wheel 34 and its shaft stationary while the mutilated portion of the wheel 31 is passing. Mounted upon the cross-bar $28^a$ in suitable ways, as shown in Fig. 15, are fourteen short shafts 36, each having a toothed wheel 37, which meshes with one of the wheels 33 immediately below. Both ends of this shaft are split diametrically, and one of the split sections 38 at each end is made removable. These sections 38 each have an inwardly-expanding hole 39, which registers with indents or grooves 40 on each side of the mid-shaft and wheel 37. The cross-strand wires 5 are threaded through the openings thus provided. The loose shaft ends 38 are mounted in a sliding reciprocating cap 41, and by sliding the cap the said ends will each be carried from the original position, taking the wire with it and by proper adjustment will be stopped exactly over the next like shaft. This change of position occurs during the interval of arrested movement of the short shafts brought about by the mutilated wheel 31. The larger and remaining portion of shaft 36 has a longitudinal opening 42, through which one of the horizontal wires 1 is threaded. This opening is enlarged radially of the shaft, as shown by the dotted lines in Fig. 13, and the position of the wire in the opening is regulated by the plate 43, which has a perforation the size of the wire and which plate is adjustable in its distance from the axis of the shaft 36. The rotation of shaft 36 causes the two wires which it carries to be twisted together. As a general thing I prefer to make the twist equally in the two wires instead of wrapping the cross-wire around the longitudinal wire; but by setting plate 43 so as to bring the longitudinal wire close to the center of shaft 36 and making a strong tension on said wire I can cause the cross-wire to be wrapped around the longitudinal wire without twisting the latter. This is sometimes desirable where extra large longitudinal wires are desired. Each cross-wire is carried back and forth between the same two longitudinal wires by the sliding back and forth of the shaft ends 38. The wheels 37 are held by the stationary bar 44, (see Figs. 9 and 14,) over which is the grooved cap 41, which receives the bar 44 in its groove, as shown in Fig. 9. The cap 41 on either side of bar 44 is notched on its lower edge to receive the shafts 36. The latter have annular flanges 45, which enter corresponding grooves in the bar 28ª and cap 41. These flanges keep the shaft-sections 38 from working longitudinally out of the cap. As the longitudinal wires 1 are different distances apart in three groups, as previously described, I divide the cap in three sections, as shown in Fig. 14, and move each section independently of the others, so as to operate with their appropriate twisting-shafts. These caps are connected by levers 46 with the arm of a bell-crank 47 (see Fig. 3) at proper distances from the pivotal point of the crank to give the desired movement to the several caps. The lower arm of bell-crank 47 is connected by rod 48 with the crank 49 on the shaft 50. The shaft 50 has the beveled pinion 51, adjacent to which is the wing-plate 52.

Mounted in suitable boxes on the frame B C is the shaft 53, on which is mounted the two spur gear-wheels 54 and 55, the teeth of which mesh with those of pinions 56 and 57 on shaft 28. The wheel 54 has a group of teeth 58 on its side, which engage the teeth of pinion 51 at each revolution of the wheel 54. There are just enough teeth 58 to give pinion 51 a half-rotation. Wheel 54 has a table 59, against which wing-plate 52 bears to hold its shaft immovable until the teeth 58 are reached. Opposite said teeth is a depression 60 in the table, which allows the plate to turn over. The crank always stops in a vertical plane and makes a half-revolution at each movement, thereby imparting a reciprocating movement to the sliding caps. The moments of action and inaction of the several parts are so synchronized that the twisting-shafts will stop with the removable sections 38 uppermost and the joints between them and the body of their shafts alined with the base of the caps at the moment that the caps are ready to move.

The shaft 50 at the end opposite the crank 49 has the crank 61, which is connected by rod 62 with a crank 63 on the shaft 64 near the bottom of the machine. This shaft 64 has the arm 65, which is connected by bar 66 with an arm 67 (see Figs. 2 and 3) on the shaft 17. The shaft 17, as previously stated, is to reciprocate the frame 15, which carries the plates that shift the longitudinal wires in the spool-carriers.

The distance between the points where the cross-wires are twisted with the horizontal wires will be regulated by the rate at which the wires are drawn through the twisters. This drawing of the wires occurs at the interval of rest of the twisters, as above described, and is accomplished by the reeling up of the finished product. This product is carried from the twisters under the drum 68, thence up and over the drum 69 at the top of the frame, and thence down and is wrapped upon the drum 70. The drums 68 and 69 are preferably made of circular disks 71, which are connected by a series of closely-placed horizontal rods 72. The drum 70 is removably mounted on shaft-stubs 73 and 74, both of which are mounted in suitable boxes supported by the frames B and C. The stub 73 has the sprocket-wheel 75 on the inside of the frame, and this wheel has a hub which forms the half of a clutch 76. The stub 73 also has the toe 77, which takes into a socket in the end of the drum-shaft 78. Mounted on the shaft 78 are a plurality of disks 79, here shown as five in number, from one side of each of which project the pins 80. These pins take into slots 81 in the two parts 82 and 83 of a split disk. The slots are oblique to the radii, whereby by moving the pins in said slots the two parts of the split disk will be separated or drawn closer together. The direction of rotation of the drum in reeling up the fence will tend to force the parts of the split disks apart, and movement in the opposite direction will bring them together. The peripheries of parts 82 and 83 are covered with sheet-metal plates 84', forming a two-part drum. The end of the strip of fencing is inserted in the split or opening between the two parts of the drum, and after the amount desired has been reeled upon the drum a reverse movement of the shaft 78 will reduce the drum's diameter and permit of the easy removal of the fence-roll. The disks 79 have suitable hubs, as shown in Fig. 16, and the hubs of the end disks are turned toward the outside. The hub adjacent to shaft-stub 73 has a half-clutch, forming a part of clutch 76. The shaft 78 extends only part way through the hub at the opposite end of the drum, thereby leaving a socket to receive the end of the stub 74. This stub has longitudinal adjustment controlled by the lever 80'. By an outward movement of the lever the stub is withdrawn from the hub and the drum released and made easily removable for the removal therefrom of the roll of fencing. The sprocket-wheel 75 is connected by chain 81 with the wheel 82 on the shaft 53.

It is obvious that as the drum 70 revolves at a uniform rate of speed, the wires will be drawn more rapidly through the twisters as the diameter of the roll increases on the drum unless some regulation is provided. Such a device I will now describe.

The shaft 84, carrying the drum 69 at the top of the frame, has the notched wheel 85. A lever 86, pivoted to the machine-frame, has a bent upper end which enters one of the notches of wheel 85 and holds it from turning until the lever is disengaged. The lower arm of the lever extends down in the path of a pin 87 on a continuously-revolving disk 88, mounted on the shaft 53. (See Fig. 5.) It has a lug 89, which engages the teeth of a ratchet-wheel 90, loosely mounted on shaft 28. At each revolution of the pin 87 the lever will be moved so as to liberate the wheel 85 and wheel 90. By the side of ratchet-wheel 90 is a ratchet-wheel 91, having teeth in reverse order to those of wheel 90. The adjacent faces of these two wheels have opposite depressions 92 and 93. The wheel 91 has a lug 94, which extends into the depression in wheel 90, and the wheel 90 has a lug 95, which extends into the depression in wheel 91. A spring 96 is secured to lug 94 and bears at its other end against the lug 95. The lugs compel the two wheels to move together in a forward direction, and the spring allows one wheel to move back or in a reverse direction for a limited distance and then brings them back when released, with the spring-pressed lug against the end of the depression. The wheel 91 has an integral pinion 96', which en-engages a large spur gear-wheel 97, mounted loosely on shaft 53. Integral with wheel 97 is the sprocket-wheel 82, from which the wheel 75 on the reeling-drum is driven. Mounted in a fixed manner on shaft 28 is the disk 97', having a plurality of lugs 98 (here shown as four) projecting from its side toward the wheel 90. These lugs are preferably provided with rollers and are so shown in the drawings. Pivoted to the adjacent side of wheel 90 is a lever 99, having a head 100, much thicker than the opposite arm 101 of the lever. The lever has a limited movement, controlled by the pin 102, which allows the head of the lever to be thrown out into the path of the lugs 98 of disk 97', and when one of the lugs strikes the head of the lever it and the attached wheel are carried around with the disk 97'. This sets in motion the previously-described mechanism, which rotates the drum on which the wire fence is reeled. When the head 100 is thrown back toward the hub of the wheel, the lugs will pass freely over the thin portion of the lever. Normally the lug 89 of lever 86 is in engagement with the teeth of wheel 90, and the wheel 91 is held from moving by the pawl 103. The moment the lever is moved by pin 87, so as to release wheel 90, the spring 96 moves the wheel 91, so as to cause the pin 102, which is carried by wheel 91 and passes through slot in arm 101, to move lever 99 into position shown in Fig. 6, with the head 100 in the path of the lugs. The lugs drive the reeling-drum until the upper end of the lever drops into the next lug of wheel 85, whereupon the reeling operation is stopped and that stops the drawing of the wires through the twisters. The length of wires drawn through the twisters will be controlled by the distance between the notches in the wheel 85. In order to get a firm bearing for the lever 99, I prefer to provide the opening 104 in wheel 90 and allow the additionally-thickened head 100 to extend through the wheel 91, in which pin 106 is seated.

To keep the horizontal wires of the fence in a straight course after they leave the twisters, I provide the wheels 109 and 110, which are mounted in a bearing 107, bolted to a crossbar 108 opposite each twister. The bar 108 is supported by the frames B C. The wheels 109 and 110 are mounted in planes oblique to each other. Their edges are serrated, and the points of the teeth meet each other at the top of the wheels. The adjacent faces of the two wheels have inward extensions, which meet at the top and with the teeth form a triangular inclosure through which the horizontal wires of the fence are passed, as shown in Fig. 25. The toothed construction permits the cross-wires to pass without obstruction. The axle 111 is a bent bolt the bend of which is engaged by the center 112 of the support 107.

Having thus fully described my invention, what I claim as new, and wish to secure by Letters Patent, is—

1. In a fence-weaving machine, reels to hold the wire, means for carrying certain of the wires back and forth between pairs of the other wires and twisting them together at their intersections, and rotating carriers between the reels and the twisters having reciprocating guides to shift the wires from one carrier to another.

2. In a wire-fence machine, a plurality of rotating shafts each carrying a pair of wires on opposite sides of the shaft-centers, means for carrying one of the wires of each pair to an adjacent shaft twisting it with a wire of that pair and returning it, rotating carriers to deliver the wires to the twisting-shafts, reciprocating points to shift the wires from one rotating carrier to another and means for drawing the wires through the twisters and reeling up the product.

3. In a wire-fence machine, a plurality of rotating shafts having laterally-separable half-shaft ends, a pair of wires passing through each shaft on diametrically opposite sides of the shaft-axis, one of said wires passing through the separable shaft ends, a cap forming a half-boxing for two or more of said shafts, means for imparting a reciprocating movement to the cap, means for crossing the wires in advance of their delivery to the shafts as the shaft ends are exchanged and for moving the wires to prevent tangling, and means for drawing the wires in regulated quantities and at regulated intervals through the twisters.

4. In a wire-fence machine shafts having an intermittent rotary movement each of said shafts having perforations through which a pair of wires are threaded, said shafts having laterally-movable portions which hold one wire of each pair, caps forming a half-boxing for the shafts each cap forming the boxing for two or more shafts, a bell-crank, levers connecting the caps with the bell-crank and an intermittently-rotating shaft having a crank connected by a rod with the bell-crank.

5. In a wire-fence machine a shaft having a bevel-pinion a flat-sided wing-plate extension from the pinion and a crank-arm, a continuously-rotating shaft at right angles to the first-mentioned shaft, a wheel mounted thereon having side teeth to engage the teeth of said pinion, the number of such side teeth being sufficient to impart a half-revolution to the first shaft, and said wheel having a table to hold the wing-plate from turning, said table having a depression opposite the group of teeth to permit the wing-plate to rotate, wire-twisters having laterally-movable portions to carry the cross-wires, caps forming part of the boxing for the twister-shafts, a bell-crank, levers connecting the caps with the bell-crank and a bar connecting the crank on the first-named shaft with the bell-crank.

6. In a fence-making machine, wire-twisters having rotary carriers to carry the cross-wires back and forth between each pair of twisters, wire-carriers to carry the wires and cross them in unison with their movement by the twisters in order to prevent tangling, laterally-reciprocating points to shift the wires between parts of the rotary carriers, a shaft having an intermittent rotary movement and means for actuating the carriers at the twisters and the carriers which deliver the wires to the twisters from said last-mentioned shaft.

7. In a fence-weaving machine, wire-twisters, means for delivering the wires to the twisters to prevent the entanglement of same, a drum upon which the finished product is wound, a drum intermediate of the first drum and the twisters, a notched wheel moving with the second drum, ratchet-wheels controlling the reeling-drum and a lever controlling the ratchet-wheels and itself controlled from the notched wheel of the second drum to determine the length of wires drawn through the twisters between each twist.

8. In a wire-fence machine twisters having wire-carriers to carry the cross-wires from one twister to the other and return, said carriers being moved and controlled from a shaft having intermittent rotary movement, laterally-shifting points also intermittently moved to shift the wires in said carriers, said intermittently-rotating shaft, and wire-carriers to carry the wires and cross them in unison with the movement of the wires at the twisters, said last-named carriers being also moved and controlled by said shaft.

9. In a wire-fence machine, the combination with the revolving carriers adapted to engage the wire and carry the same in a circular path around the axes of such carriers, of tapering guides between the carriers reciprocating laterally of the carriers to shift the wires from one carrier to the next, and intermittently-driven twisting mechanism.

10. In a wire-fence machine, the combination with the revolving carriers adapted to engage the wire and carry the same in a circular path around the axes of such carriers of a double row of tapering guides with their points toward a plane through the axes of the carriers, between which said carriers are placed, every alternate one of said guides having a to-and-fro movement at predetermined times, and intermittently-driven twisting mechanism.

11. In a wire-fence machine, the combination with holders for the woof or cross strands of the fence, of carriers mounted to revolve upon axes coincident with said holders, said carriers having peripheral geared teeth, with notches or openings between some of said geared teeth adapted to receive the warp or horizontal wire of said fence, said carriers being so disposed that their notches will register at one or more points during their revolution, of a series of pointed plates having lateral reciprocating movement at predetermined intervals past said notches whereby the wire may be shifted from one of said carriers to the next adjacent one, and intermittently-driven twisting mechanism.

12. In a fence-machine a shaft-stub mounted in a suitable box having a half-clutch on its inner end and a centrally-projecting toe, a shaft having a drum thereon said shaft having a clutch-half to mate with the clutch-half of said stub, means for supporting said drum-shaft from said stub comprising a socket to receive said toe, a socket at the opposite end of the drum and a second stub-shaft having longitudinal adjustment whereby it may be inserted into the socket of the drum to complete the support of the drum or withdrawn to permit of the removal of the drum when desired.

13. The combination with a wire-fence-weaving machine and reels to hold the supply of wire, of tension devices to regulate the movement of the wire from the reels, comprising a plurality of shafts mounted in suitable bearings and having a grooved wheel on one end of each shaft around which a wire is wrapped, said wheel having transverse openings through its web, and a plate at the other end having fingers to take loosely through the openings of the web of the wheel.

14. In a fence-machine drums over which the product is passed comprising circular supporting-disks and a connecting-body comprising a series of parallel rods which form the surface of the cylinder and enter the disk without projecting through them.

15. In a fence-machine, reels to hold the wire-supply, twisters to carry the cross-wires between each two horizontal wires and twist the cross and horizontal wires together, wire-carriers to keep the wires from becoming tangled in passage from the reels to the twisters, reciprocating points to shift the wires from one carrier to another, a drum under which the product passes from the twisters, a second drum above the first over which the product passes, a third drum around which the product is reeled, and a governor device between the twisters and the reeling-drum to regulate the speed at which the wire is drawn through the twisters.

16. In a fence-weaving machine, a number of wire-twisters equal to the number of longitudinal wires in the fence to be woven, carriers to carry cross-wires successively between every two twisters, spools of a number less by one than the number of longitudinal wires each carrying the cross-wires, rotating heads in pairs between each of which pairs a spool of cross-wire is mounted, said heads carrying the longitudinal wires around the spools and laterally-shifting points to change the wires back and forth between said pairs with the crossing of the wires at the twisters, and an extra pair of heads at each end of the series of cross-wire spools.

17. The combination with wire-twisters and means for drawing the wires through the twisters, of serrated guide-wheels arranged in pairs oblique to each other so the points of their teeth meet, said wheels having lateral inner extensions which meet below the contacting teeth and complete therewith a holder for the longitudinal fence-wires.

In witness whereof I have hereunto set my hand and seal, at Indianapolis, Indiana, this 4th day of June, A. D. 1902.

GEORGE W. WHITTINGTON. [L. S.]

Witnesses:
S. MAHLON UNGER,
J. A. MINTURN.